United States Patent
Rao (10) Patent No.: US 10,649,624 B2
(45) Date of Patent: May 12, 2020

(54) MEDIA MANAGEMENT SYSTEM SUPPORTING A PLURALITY OF MOBILE DEVICES

(71) Applicant: QUALTRICS, LLC, Provo, UT (US)

(72) Inventor: Bindu Rama Rao, Laguna Niguel, CA (US)

(73) Assignee: QUALTRICS, LLC, Provo, UT (US)

( * ) Notice: Subject to any disclaimer, the term of this patent is extended or adjusted under 35 U.S.C. 154(b) by 690 days.

(21) Appl. No.: 14/985,344

(22) Filed: Dec. 30, 2015

(65) Prior Publication Data

US 2016/0119439 A1 Apr. 28, 2016

Related U.S. Application Data

(63) Continuation of application No. 14/848,134, filed on Sep. 8, 2015, which is a continuation of application
(Continued)

(51) Int. Cl.
*G06Q 30/02* (2012.01)
*G06F 3/0482* (2013.01)
(Continued)

(52) U.S. Cl.
CPC ........ *G06F 3/0482* (2013.01); *G06F 3/04842* (2013.01); *G06F 16/2358* (2019.01);
(Continued)

(58) Field of Classification Search
CPC ............. G06F 3/0482; G06F 17/30554; G06F 17/3053; G06F 17/30867; G06F 17/30864;
(Continued)

(56) References Cited

U.S. PATENT DOCUMENTS

| 3,647,926 A | 3/1972 | Rohloff et al. |
| 5,036,389 A | 7/1991 | Morales |

(Continued)

FOREIGN PATENT DOCUMENTS

WO    WO 06/051858    5/2006

OTHER PUBLICATIONS

U.S. Appl. No. 13/412,574, Apr. 21, 2016, Office Action.
(Continued)

*Primary Examiner* — Marcus Hammonds
(74) *Attorney, Agent, or Firm* — Keller Jolley Preece (57) ABSTRACT

An interactive media management server that facilitates management of interactive media and delivery of such interactive media. It comprises a first interface to an interactive media distribution server communicatively coupled to a plurality of mobile devices, and a second interface to a service provider system or a content provider system. It comprises a manager module for managing creation, distribution and tracking of a plurality of interactive media. The manager module, via the second interface, manages the delivery of the plurality of interactive media from the service provider system or the content provider system, and the communication of user responses to the plurality of interactive media to the corresponding service provider system or content provider system.

20 Claims, 3 Drawing Sheets

Related U.S. Application Data

No. 13/908,447, filed on Jun. 3, 2013, now Pat. No. 9,158,437, which is a continuation of application No. 13/354,811, filed on Jan. 20, 2012, now Pat. No. 8,478,250, which is a continuation-in-part of application No. 11/888,100, filed on Jul. 30, 2007, now Pat. No. 8,131,270.

(60) Provisional application No. 60/860,700, filed on Nov. 22, 2006.

(51) Int. Cl.
| | |
|---|---|
| *G06F 16/248* | (2019.01) |
| *G06F 16/951* | (2019.01) |
| *G06F 16/23* | (2019.01) |
| *G06F 16/9535* | (2019.01) |
| *G06F 16/2457* | (2019.01) |
| *H04L 29/08* | (2006.01) |
| *G06F 3/0484* | (2013.01) |
| *H04N 21/81* | (2011.01) |

(52) U.S. Cl.
CPC ...... *G06F 16/248* (2019.01); *G06F 16/24578* (2019.01); *G06F 16/951* (2019.01); *G06F 16/9535* (2019.01); *G06Q 30/0203* (2013.01); *G06Q 30/0245* (2013.01); *G06Q 30/0267* (2013.01); *H04L 67/06* (2013.01); *H04L 67/18* (2013.01); *H04L 67/22* (2013.01); *H04L 67/306* (2013.01); *H04L 67/34* (2013.01); *H04N 21/812* (2013.01)

(58) Field of Classification Search
CPC ............ G06F 3/04842; G06Q 30/0267; G06Q 30/0203; H04L 67/306; H04L 67/18; H04L 67/06; H04L 67/22; H04L 67/34; H04N 21/812
USPC ............................................ 455/414.1–414.4
See application file for complete search history.

(56) References Cited

U.S. PATENT DOCUMENTS

| | | |
|---|---|---|
| 5,680,305 A | 10/1997 | Apgar, IV |
| 5,740,035 A | 4/1998 | Cohen et al. |
| 5,801,754 A | 9/1998 | Ruybal et al. |
| 5,805,821 A | 9/1998 | Saxena |
| 5,838,314 A | 11/1998 | Neel et al. |
| 5,862,223 A | 1/1999 | Walker et al. |
| 5,870,454 A | 2/1999 | Dahlen |
| 5,873,068 A | 2/1999 | Beaumont et al. |
| 5,905,974 A | 5/1999 | Fraser et al. |
| 5,915,243 A | 6/1999 | Smolen |
| 5,970,473 A | 10/1999 | Gerszberg et al. |
| 6,057,872 A | 5/2000 | Candelore |
| 6,098,085 A | 8/2000 | Blonder et al. |
| 6,161,458 A | 12/2000 | Spatafora |
| 6,175,822 B1 | 1/2001 | Jones |
| 6,189,029 B1 | 2/2001 | Fuerst |
| 6,216,112 B1 | 4/2001 | Fuller et al. |
| 6,267,379 B1 | 7/2001 | Forrest et al. |
| 6,282,713 B1 | 8/2001 | Kitsukawa et al. |
| 6,302,698 B1 | 10/2001 | Ziv-El |
| 6,430,624 B1 | 8/2002 | Jamtgaard et al. |
| 6,477,504 B1 | 11/2002 | Hamlin et al. |
| 6,501,779 B1 | 12/2002 | McLaughlin et al. |
| 6,502,242 B1 | 12/2002 | Howe et al. |
| 6,513,014 B1 | 1/2003 | Walker et al. |
| 6,554,618 B1 | 4/2003 | Lockwood |
| 6,587,835 B1 | 7/2003 | Treyz et al. |
| 6,631,377 B2 | 10/2003 | Kuzumaki |
| 6,721,713 B1 | 4/2004 | Guheen et al. |
| 6,735,778 B2 | 5/2004 | Khoo et al. |
| 6,801,931 B1 | 10/2004 | Ramesh et al. |
| 6,807,532 B1 * | 10/2004 | Kolls ............... G06Q 10/10 705/7.32 |
| 6,819,669 B2 | 11/2004 | Rooney |
| 6,823,046 B2 | 11/2004 | Yamade et al. |
| 6,873,688 B1 | 3/2005 | Aarnio |
| 6,873,967 B1 | 3/2005 | Kalagnanam et al. |
| 6,907,402 B1 | 6/2005 | Khaitan |
| 6,941,324 B2 | 9/2005 | Plastina et al. |
| 6,973,432 B1 | 12/2005 | Woodard et al. |
| 7,020,685 B1 | 3/2006 | Chen et al. |
| 7,024,381 B1 | 4/2006 | Hastings et al. |
| 7,032,030 B1 | 4/2006 | Codignotto |
| 7,096,464 B1 | 8/2006 | Weinmann |
| 7,107,311 B1 | 9/2006 | Zittrain et al. |
| 7,137,126 B1 | 11/2006 | Coffman et al. |
| 7,194,756 B2 | 3/2007 | Addington et al. |
| 7,197,120 B2 | 3/2007 | Luehrig et al. |
| 7,222,158 B2 | 5/2007 | Wexelblat |
| 7,261,239 B2 | 8/2007 | Rao |
| 7,310,350 B1 * | 12/2007 | Shao ................ H04W 4/00 370/466 |
| 7,336,928 B2 | 2/2008 | Paalasmaa et al. |
| 7,337,127 B1 | 2/2008 | Smith et al. |
| 7,346,545 B2 | 3/2008 | Jones |
| 7,373,320 B1 | 5/2008 | McDonough |
| 7,373,323 B1 | 5/2008 | Dalal et al. |
| 7,405,752 B2 | 7/2008 | Kondo et al. |
| 7,418,472 B2 | 8/2008 | Shoemaker et al. |
| 7,434,050 B2 | 10/2008 | Jeffries et al. |
| 7,444,380 B1 | 10/2008 | Diamond |
| 7,487,435 B2 | 2/2009 | Aviv |
| 7,496,943 B1 | 2/2009 | Goldberg et al. |
| 7,542,920 B1 | 6/2009 | Lin-Hendel |
| 7,657,022 B2 | 2/2010 | Anderson |
| 7,660,864 B2 | 2/2010 | Markki et al. |
| 7,664,734 B2 | 2/2010 | Lawrence et al. |
| 7,685,252 B1 | 3/2010 | Maes et al. |
| 7,688,820 B2 | 3/2010 | Forte et al. |
| 7,706,740 B2 | 4/2010 | Collins et al. |
| 7,715,790 B1 | 5/2010 | Kennedy |
| 7,725,424 B1 | 5/2010 | Ponte et al. |
| 7,783,529 B2 | 8/2010 | Sandholm et al. |
| 7,797,186 B2 | 9/2010 | Dybus |
| 7,827,235 B2 | 11/2010 | Iizuka |
| 7,853,272 B2 | 12/2010 | Tipnis et al. |
| 7,865,829 B1 | 1/2011 | Goldfield et al. |
| 7,899,700 B2 | 3/2011 | Floyd et al. |
| 7,941,092 B2 | 5/2011 | Rao |
| 7,947,714 B2 | 5/2011 | Hoffberg |
| 7,956,272 B2 | 6/2011 | Wysocki |
| 7,970,818 B2 | 6/2011 | Guedalia et al. |
| 7,983,611 B2 | 7/2011 | Rao |
| 8,037,506 B2 | 10/2011 | Cooper et al. |
| 8,041,365 B1 * | 10/2011 | Gentle ................ G06Q 30/02 379/265.01 |
| 8,041,713 B2 | 10/2011 | Lawrence |
| 8,055,546 B1 | 11/2011 | Cassone et al. |
| 8,073,013 B2 | 12/2011 | Coleman et al. |
| 8,078,096 B2 | 12/2011 | Rao |
| 8,103,738 B2 | 1/2012 | Nguyen |
| 8,131,270 B2 | 3/2012 | Rao |
| 8,135,331 B2 | 3/2012 | Rao |
| 8,175,511 B1 | 5/2012 | Sordo et al. |
| 8,180,276 B2 | 5/2012 | Rao |
| 8,191,104 B2 | 5/2012 | Gordon et al. |
| 8,195,749 B2 | 6/2012 | Rao |
| 8,249,920 B2 | 8/2012 | Smith |
| 8,270,893 B2 | 9/2012 | Rao |
| 8,285,196 B2 | 10/2012 | Rao |
| 8,290,810 B2 | 10/2012 | Ramer et al. |
| 8,380,175 B2 | 2/2013 | Rao |
| 8,385,813 B2 | 2/2013 | Rao |
| 8,428,645 B2 | 4/2013 | Rao |
| 8,433,299 B2 | 4/2013 | Rao |
| 8,478,250 B2 | 7/2013 | Rao |
| 8,532,636 B2 | 9/2013 | Rao |
| 8,532,713 B2 | 9/2013 | Rao |

(56) References Cited

U.S. PATENT DOCUMENTS

| | | | |
|---|---|---|---|
| 8,540,514 B2 * | 9/2013 | Gosling | G09B 7/00 379/92.01 |
| 8,565,719 B2 | 10/2013 | Rao | |
| 8,700,014 B2 | 4/2014 | Rao | |
| 8,700,015 B2 | 4/2014 | Rao | |
| 8,898,708 B2 | 11/2014 | Rao | |
| 9,092,794 B2 | 7/2015 | Rao | |
| 9,100,800 B2 | 8/2015 | Rao | |
| 9,158,437 B2 | 10/2015 | Rao | |
| 2001/0005837 A1 | 6/2001 | Kojo | |
| 2001/0023436 A1 | 9/2001 | Srinivasan et al. | |
| 2001/0034607 A1 | 10/2001 | Perschbacher et al. | |
| 2001/0042041 A1 | 11/2001 | Moshal et al. | |
| 2001/0044327 A1 | 11/2001 | Kanefsky | |
| 2001/0044751 A1 | 11/2001 | Pugliese et al. | |
| 2001/0047264 A1 * | 11/2001 | Roundtree | G06Q 10/04 704/275 |
| 2001/0047373 A1 | 11/2001 | Jones et al. | |
| 2001/0049286 A1 | 12/2001 | Hansmann et al. | |
| 2001/0056374 A1 | 12/2001 | Joao | |
| 2001/0056396 A1 | 12/2001 | Goino | |
| 2002/0001395 A1 | 1/2002 | Davis et al. | |
| 2002/0006124 A1 | 1/2002 | Jimenez et al. | |
| 2002/0007303 A1 | 1/2002 | Brookler et al. | |
| 2002/0016818 A1 | 2/2002 | Kirani et al. | |
| 2002/0035486 A1 | 3/2002 | Huyn et al. | |
| 2002/0035488 A1 | 3/2002 | Aquila et al. | |
| 2002/0040346 A1 | 4/2002 | Kwan | |
| 2002/0046200 A1 | 4/2002 | Floven et al. | |
| 2002/0052774 A1 | 5/2002 | Parker et al. | |
| 2002/0054089 A1 | 5/2002 | Nicholas et al. | |
| 2002/0059132 A1 | 5/2002 | Quay et al. | |
| 2002/0059373 A1 | 5/2002 | Boys | |
| 2002/0059621 A1 | 5/2002 | Thomas et al. | |
| 2002/0069161 A1 | 6/2002 | Eckert et al. | |
| 2002/0070961 A1 | 6/2002 | Xu et al. | |
| 2002/0071528 A1 | 6/2002 | Kumamoto | |
| 2002/0106617 A1 | 8/2002 | Hersh | |
| 2002/0107737 A1 | 8/2002 | Kaneko et al. | |
| 2002/0108109 A1 | 8/2002 | Harris et al. | |
| 2002/0116258 A1 | 8/2002 | Stamatelatos et al. | |
| 2002/0120593 A1 | 8/2002 | Iemoto et al. | |
| 2002/0123359 A1 | 9/2002 | Wei et al. | |
| 2002/0124247 A1 | 9/2002 | Houghton | |
| 2002/0128908 A1 | 9/2002 | Levin et al. | |
| 2002/0138334 A1 | 9/2002 | DeCotiis et al. | |
| 2002/0138392 A1 | 9/2002 | LeBlanc | |
| 2002/0138462 A1 | 9/2002 | Ricketts | |
| 2002/0143975 A1 | 10/2002 | Kimura et al. | |
| 2002/0152110 A1 * | 10/2002 | Stewart | G06Q 30/02 705/7.32 |
| 2002/0155419 A1 | 10/2002 | Banerjee et al. | |
| 2002/0156673 A1 | 10/2002 | Barker | |
| 2002/0161708 A1 | 10/2002 | Offer | |
| 2002/0161833 A1 | 10/2002 | Niven et al. | |
| 2002/0165666 A1 | 11/2002 | Fuchs et al. | |
| 2002/0178223 A1 | 11/2002 | Bushkin | |
| 2002/0183059 A1 | 12/2002 | Noreen et al. | |
| 2002/0188746 A1 | 12/2002 | Drosset et al. | |
| 2002/0198769 A1 | 12/2002 | Ratcliff, III | |
| 2003/0003946 A1 | 1/2003 | Bocconi | |
| 2003/0009371 A1 | 1/2003 | Gauba et al. | |
| 2003/0014400 A1 | 1/2003 | Siegel | |
| 2003/0028871 A1 | 2/2003 | Wang et al. | |
| 2003/0036935 A1 | 2/2003 | Nel | |
| 2003/0037033 A1 | 2/2003 | Nyman et al. | |
| 2003/0037068 A1 | 2/2003 | Thomas et al. | |
| 2003/0046140 A1 | 3/2003 | Callahan et al. | |
| 2003/0050959 A1 | 3/2003 | Faybishenko et al. | |
| 2003/0060284 A1 | 3/2003 | Hamalainen et al. | |
| 2003/0065784 A1 | 4/2003 | Herrod | |
| 2003/0077559 A1 | 4/2003 | Braunberger et al. | |
| 2003/0083895 A1 | 5/2003 | Wright et al. | |
| 2003/0084051 A1 | 5/2003 | Depura et al. | |
| 2003/0088452 A1 | 5/2003 | Kelly | |
| 2003/0088609 A1 | 5/2003 | Guedalia et al. | |
| 2003/0096625 A1 | 5/2003 | Lee et al. | |
| 2003/0097280 A1 | 5/2003 | Fitzpatrick et al. | |
| 2003/0110234 A1 | 6/2003 | Egli et al. | |
| 2003/0115463 A1 | 6/2003 | Wheeler et al. | |
| 2003/0115602 A1 | 6/2003 | Knee et al. | |
| 2003/0131055 A1 | 7/2003 | Yashchin et al. | |
| 2003/0144873 A1 | 7/2003 | Keshel | |
| 2003/0144899 A1 | 7/2003 | Kokubo | |
| 2003/0154126 A1 | 8/2003 | Gehlot et al. | |
| 2003/0154242 A1 | 8/2003 | Hayes et al. | |
| 2003/0163527 A1 | 8/2003 | Hsu | |
| 2003/0182245 A1 | 9/2003 | Seo | |
| 2003/0204406 A1 | 10/2003 | Reardon et al. | |
| 2003/0208433 A1 | 11/2003 | Haddad et al. | |
| 2003/0208756 A1 | 11/2003 | Macrae et al. | |
| 2003/0211856 A1 | 11/2003 | Zilliacus | |
| 2003/0212804 A1 | 11/2003 | Hashemi | |
| 2003/0216982 A1 | 11/2003 | Close et al. | |
| 2003/0218604 A1 | 11/2003 | Wood et al. | |
| 2003/0229533 A1 | 12/2003 | MacK et al. | |
| 2003/0233422 A1 | 12/2003 | Csaszar et al. | |
| 2004/0019497 A1 | 1/2004 | Volk et al. | |
| 2004/0023191 A1 | 2/2004 | Brown et al. | |
| 2004/0030631 A1 | 2/2004 | Brown et al. | |
| 2004/0034561 A1 | 2/2004 | Smith | |
| 2004/0034684 A1 | 2/2004 | Payne | |
| 2004/0039684 A1 | 2/2004 | Sandor | |
| 2004/0043372 A1 | 3/2004 | Jebb et al. | |
| 2004/0044559 A1 | 3/2004 | Malik et al. | |
| 2004/0054577 A1 | 3/2004 | Inoue et al. | |
| 2004/0058694 A1 | 3/2004 | Mendiola et al. | |
| 2004/0064351 A1 | 4/2004 | Mikurak | |
| 2004/0064833 A1 | 4/2004 | Lee et al. | |
| 2004/0072136 A1 | 4/2004 | Roschelle et al. | |
| 2004/0073476 A1 | 4/2004 | Donahue et al. | |
| 2004/0082346 A1 | 4/2004 | Skytt et al. | |
| 2004/0122856 A1 | 6/2004 | Clearwater | |
| 2004/0128183 A1 | 7/2004 | Challey et al. | |
| 2004/0139232 A1 | 7/2004 | Giannetti et al. | |
| 2004/0139472 A1 | 7/2004 | Furet et al. | |
| 2004/0142720 A1 | 7/2004 | Smethers | |
| 2004/0148219 A1 | 7/2004 | Norris, III | |
| 2004/0179039 A1 | 9/2004 | Blattner et al. | |
| 2004/0190767 A1 | 9/2004 | Tedesco et al. | |
| 2004/0193683 A1 | 9/2004 | Blumofe | |
| 2004/0210923 A1 | 10/2004 | Hudgeons et al. | |
| 2004/0225606 A1 | 11/2004 | Nguyen | |
| 2004/0230656 A1 | 11/2004 | Sugawara | |
| 2004/0234936 A1 | 11/2004 | Ullman et al. | |
| 2004/0244037 A1 | 12/2004 | Yamaguchi et al. | |
| 2004/0250272 A1 | 12/2004 | Durden et al. | |
| 2004/0252814 A1 | 12/2004 | Eakin | |
| 2004/0260761 A1 | 12/2004 | Leaute et al. | |
| 2005/0005174 A1 | 1/2005 | Connors | |
| 2005/0009465 A1 | 1/2005 | Ross et al. | |
| 2005/0010544 A1 | 1/2005 | Sleat | |
| 2005/0010651 A1 | 1/2005 | Xu et al. | |
| 2005/0018766 A1 | 1/2005 | Iwamura | |
| 2005/0021754 A1 | 1/2005 | Alda et al. | |
| 2005/0027616 A1 | 2/2005 | Jones | |
| 2005/0027654 A1 | 2/2005 | Adrian | |
| 2005/0028005 A1 | 2/2005 | Carson et al. | |
| 2005/0044223 A1 | 2/2005 | Meyerson | |
| 2005/0048954 A1 | 3/2005 | Gortz et al. | |
| 2005/0054286 A1 | 3/2005 | Kanjilal et al. | |
| 2005/0055310 A1 | 3/2005 | Drewett et al. | |
| 2005/0060759 A1 | 3/2005 | Rowe et al. | |
| 2005/0066361 A1 | 3/2005 | Iijima | |
| 2005/0080683 A1 | 4/2005 | Jordan | |
| 2005/0086355 A1 | 4/2005 | Deshpande | |
| 2005/0086605 A1 | 4/2005 | Ferrer et al. | |
| 2005/0108750 A1 | 5/2005 | Nishikawa et al. | |
| 2005/0114400 A1 * | 5/2005 | Rao | G06Q 10/10 |
| 2005/0131983 A1 | 6/2005 | Raciborski et al. | |
| 2005/0132192 A1 | 6/2005 | Jeffries et al. | |
| 2005/0144061 A1 | 6/2005 | Rarity et al. | |
| 2005/0144538 A1 | 6/2005 | Lawrence et al. | |
| 2005/0149501 A1 | 7/2005 | Barrett | |

(56) References Cited

U.S. PATENT DOCUMENTS

| | | |
|---|---|---|
| 2005/0150943 A1 | 7/2005 | Rao |
| 2005/0159142 A1 | 7/2005 | Giniger et al. |
| 2005/0165663 A1 | 7/2005 | Razumov |
| 2005/0181722 A1 | 8/2005 | Kopra et al. |
| 2005/0193333 A1 | 9/2005 | Ebert |
| 2005/0203940 A1 | 9/2005 | Farrar et al. |
| 2005/0209050 A1 | 9/2005 | Bartels |
| 2005/0223068 A1 | 10/2005 | Shohfi et al. |
| 2005/0235318 A1 | 10/2005 | Grauch et al. |
| 2005/0240472 A1 | 10/2005 | Postrel |
| 2005/0240623 A1 | 10/2005 | Kobza et al. |
| 2005/0242189 A1 | 11/2005 | Rohs |
| 2005/0251749 A1 | 11/2005 | Lamkin et al. |
| 2005/0256866 A1 | 11/2005 | Lu et al. |
| 2005/0262540 A1 | 11/2005 | Swix et al. |
| 2005/0267816 A1 | 12/2005 | Jaramillo |
| 2005/0283405 A1 | 12/2005 | Mallo et al. |
| 2005/0283428 A1 | 12/2005 | Bartels et al. |
| 2005/0283736 A1 | 12/2005 | Elie |
| 2005/0288958 A1 | 12/2005 | Eraker et al. |
| 2005/0288999 A1 | 12/2005 | Lerner et al. |
| 2006/0015637 A1 | 1/2006 | Chung |
| 2006/0029051 A1 | 2/2006 | Harris |
| 2006/0031591 A1 | 2/2006 | Hollstrom et al. |
| 2006/0034266 A1 | 2/2006 | Harris |
| 2006/0036448 A1 | 2/2006 | Haynie et al. |
| 2006/0047729 A1 | 3/2006 | Yuan |
| 2006/0059174 A1 | 3/2006 | Mese et al. |
| 2006/0068818 A1 | 3/2006 | Leitersdorf et al. |
| 2006/0080232 A1 | 4/2006 | Epps |
| 2006/0085816 A1 | 4/2006 | Funk et al. |
| 2006/0085823 A1 | 4/2006 | Bell et al. |
| 2006/0091203 A1 | 5/2006 | Bakker et al. |
| 2006/0123082 A1 | 6/2006 | Digate et al. |
| 2006/0126544 A1 | 6/2006 | Markel et al. |
| 2006/0129455 A1 | 6/2006 | Shah |
| 2006/0148420 A1 | 7/2006 | Wonak et al. |
| 2006/0155513 A1 | 7/2006 | Mizrahi et al. |
| 2006/0170956 A1 | 8/2006 | Jung et al. |
| 2006/0178947 A1 | 8/2006 | Zsigmond et al. |
| 2006/0190403 A1 | 8/2006 | Lin et al. |
| 2006/0194185 A1 | 8/2006 | Goldberg et al. |
| 2006/0195441 A1 | 8/2006 | Julia et al. |
| 2006/0200384 A1 | 9/2006 | Arutunian et al. |
| 2006/0203758 A1 | 9/2006 | Tee et al. |
| 2006/0206493 A1 | 9/2006 | Lipscomb et al. |
| 2006/0227364 A1 | 10/2006 | Frank |
| 2006/0240851 A1 | 10/2006 | Washburn |
| 2006/0242687 A1 | 10/2006 | Thione et al. |
| 2006/0246915 A1 | 11/2006 | Shrivastava |
| 2006/0259866 A1 | 11/2006 | Prasad et al. |
| 2006/0261151 A1 | 11/2006 | Hansen et al. |
| 2006/0262922 A1 | 11/2006 | Margulies et al. |
| 2006/0265280 A1 | 11/2006 | Nakada et al. |
| 2006/0265281 A1 | 11/2006 | Sprovieri et al. |
| 2006/0277129 A1 | 12/2006 | Johnston |
| 2006/0282304 A1 | 12/2006 | Bedard et al. |
| 2006/0288363 A1 | 12/2006 | Kunkel et al. |
| 2006/0290661 A1 | 12/2006 | Innanen et al. |
| 2006/0294186 A1 | 12/2006 | Nguyen et al. |
| 2007/0001806 A1 | 1/2007 | Poll |
| 2007/0016472 A1 | 1/2007 | Reznik |
| 2007/0022214 A1 | 1/2007 | Harcourt |
| 2007/0025538 A1 | 2/2007 | Jarske et al. |
| 2007/0036282 A1 | 2/2007 | Engelke et al. |
| 2007/0038941 A1 | 2/2007 | Wysocki |
| 2007/0050256 A1 | 3/2007 | Walker et al. |
| 2007/0053513 A1 | 3/2007 | Hoffberg |
| 2007/0060225 A1 | 3/2007 | Hosogai et al. |
| 2007/0061260 A1 | 3/2007 | deGroeve |
| 2007/0086773 A1 | 4/2007 | Ramsten |
| 2007/0099636 A1 | 5/2007 | Roth |
| 2007/0101358 A1 | 5/2007 | Ambady |
| 2007/0105496 A1 | 5/2007 | Bonta et al. |
| 2007/0113263 A1 | 5/2007 | Chatani |
| 2007/0115346 A1 | 5/2007 | Kim et al. |
| 2007/0121580 A1 | 5/2007 | Forte et al. |
| 2007/0121846 A1 | 5/2007 | Altberg et al. |
| 2007/0130463 A1 | 6/2007 | Law et al. |
| 2007/0130585 A1 | 6/2007 | Perret et al. |
| 2007/0136374 A1 | 6/2007 | Guedalia |
| 2007/0136773 A1 | 6/2007 | O'Neil et al. |
| 2007/0142060 A1 | 6/2007 | Moton, Jr. et al. |
| 2007/0150452 A1 | 6/2007 | Tsurumaki et al. |
| 2007/0150512 A1* | 6/2007 | Kong ................ G06Q 10/10 |
| 2007/0150608 A1 | 6/2007 | Randall et al. |
| 2007/0154168 A1 | 7/2007 | Cordray et al. |
| 2007/0155411 A1 | 7/2007 | Morrison |
| 2007/0156828 A1 | 7/2007 | Bramoulle |
| 2007/0157223 A1 | 7/2007 | Cordray et al. |
| 2007/0162459 A1 | 7/2007 | Desai et al. |
| 2007/0162502 A1 | 7/2007 | Thomas et al. |
| 2007/0162566 A1 | 7/2007 | Desai et al. |
| 2007/0174861 A1 | 7/2007 | Song et al. |
| 2007/0192168 A1* | 8/2007 | Van Luchene ...... G06Q 10/047 |
| | | 705/14.54 |
| 2007/0201681 A1 | 8/2007 | Chen et al. |
| 2007/0204003 A1 | 8/2007 | Abramson |
| 2007/0220575 A1 | 9/2007 | Cooper et al. |
| 2007/0233729 A1 | 10/2007 | Inoue et al. |
| 2007/0235527 A1 | 10/2007 | Appleyard |
| 2007/0244749 A1 | 10/2007 | Speiser et al. |
| 2007/0244758 A1 | 10/2007 | Xie |
| 2007/0245365 A1 | 10/2007 | Mitsui |
| 2007/0245366 A1 | 10/2007 | Mitsui |
| 2007/0281692 A1 | 12/2007 | Bucher et al. |
| 2007/0288315 A1 | 12/2007 | Skillen et al. |
| 2007/0294254 A1 | 12/2007 | Yao |
| 2007/0294354 A1 | 12/2007 | Sylvain |
| 2007/0299681 A1 | 12/2007 | Plastina et al. |
| 2008/0005341 A1 | 1/2008 | Subbian |
| 2008/0009268 A1 | 1/2008 | Ramer |
| 2008/0010351 A1 | 1/2008 | Wardhaugh et al. |
| 2008/0013700 A1 | 1/2008 | Butina |
| 2008/0021721 A1 | 1/2008 | Jones et al. |
| 2008/0022325 A1 | 1/2008 | Ober et al. |
| 2008/0027874 A1 | 1/2008 | Monseignat et al. |
| 2008/0040303 A1 | 2/2008 | Fogelson |
| 2008/0066080 A1 | 3/2008 | Campbell |
| 2008/0069120 A1 | 3/2008 | Thomas |
| 2008/0072139 A1 | 3/2008 | Salinas et al. |
| 2008/0082394 A1 | 4/2008 | Floyd et al. |
| 2008/0085675 A1 | 4/2008 | Rao |
| 2008/0085682 A1 | 4/2008 | Rao |
| 2008/0092181 A1 | 4/2008 | Britt |
| 2008/0098071 A1 | 4/2008 | Jones et al. |
| 2008/0107244 A1 | 5/2008 | Setzer |
| 2008/0109278 A1 | 5/2008 | Rao |
| 2008/0119133 A1 | 5/2008 | Rao |
| 2008/0119167 A1 | 5/2008 | Rao |
| 2008/0124687 A1 | 5/2008 | Post |
| 2008/0126113 A1 | 5/2008 | Manning et al. |
| 2008/0126193 A1 | 5/2008 | Robinson |
| 2008/0126226 A1 | 5/2008 | Popkiewicz et al. |
| 2008/0132252 A1 | 6/2008 | Altman et al. |
| 2008/0139239 A1 | 6/2008 | O'Connor |
| 2008/0159178 A1 | 7/2008 | Syrjanen et al. |
| 2008/0163075 A1 | 7/2008 | Beck |
| 2008/0167946 A1 | 7/2008 | Bezos |
| 2008/0201731 A1 | 8/2008 | Howcroft |
| 2008/0209491 A1 | 8/2008 | Hasek |
| 2008/0214162 A1 | 9/2008 | Ramer et al. |
| 2008/0221986 A1 | 9/2008 | Soicher et al. |
| 2008/0222046 A1 | 9/2008 | McIsaac |
| 2008/0227076 A1 | 9/2008 | Johnson |
| 2008/0261524 A1 | 10/2008 | Grushkevich |
| 2008/0261625 A1 | 10/2008 | Hughes |
| 2008/0267155 A1 | 10/2008 | Aragones et al. |
| 2008/0269636 A1 | 10/2008 | Burrows et al. |
| 2008/0281687 A1 | 11/2008 | Hurwitz et al. |
| 2008/0281711 A1 | 11/2008 | Bridges et al. |
| 2008/0288276 A1 | 11/2008 | Harris |
| 2008/0294760 A1 | 11/2008 | Sampson et al. |
| 2008/0299953 A1 | 12/2008 | Rao |

(56) References Cited

U.S. PATENT DOCUMENTS

| | | |
|---|---|---|
| 2008/0301231 A1 | 12/2008 | Mehta et al. |
| 2009/0011748 A1 | 1/2009 | Hotta |
| 2009/0037265 A1 | 2/2009 | Moona |
| 2009/0063379 A1 | 3/2009 | Kelly |
| 2009/0076882 A1 | 3/2009 | Mei et al. |
| 2009/0117845 A1 | 5/2009 | Rao |
| 2009/0119693 A1 | 5/2009 | Higgins et al. |
| 2009/0119700 A1 | 5/2009 | Sansom |
| 2009/0125510 A1 | 5/2009 | Graham et al. |
| 2009/0176522 A1 | 7/2009 | Kowalewski et al. |
| 2009/0187814 A1 | 7/2009 | Raff |
| 2009/0210347 A1 | 8/2009 | Sarcanin |
| 2009/0240569 A1 | 9/2009 | Ramer et al. |
| 2009/0254851 A1 | 10/2009 | Scott et al. |
| 2009/0259552 A1 | 10/2009 | Chenard et al. |
| 2009/0320077 A1 | 12/2009 | Gazdzinski |
| 2010/0036970 A1 | 2/2010 | Sidi et al. |
| 2010/0094878 A1 | 4/2010 | Soroca et al. |
| 2010/0125498 A1 | 5/2010 | Jaramillo |
| 2010/0128666 A1 | 5/2010 | Masson et al. |
| 2010/0262923 A1 | 10/2010 | Citrin et al. |
| 2010/0324971 A1* | 12/2010 | Morsberger ........... G06Q 30/02 705/7.32 |
| 2011/0041077 A1 | 2/2011 | Reiner |
| 2011/0113090 A1 | 5/2011 | Peeri |
| 2011/0125838 A1 | 5/2011 | Rao |
| 2011/0154397 A1 | 6/2011 | Macrae et al. |
| 2011/0178877 A1 | 7/2011 | Swix et al. |
| 2011/0197236 A1 | 8/2011 | Rao |
| 2011/0265116 A1 | 10/2011 | Stern et al. |
| 2012/0022905 A1 | 1/2012 | Meyer et al. |
| 2012/0028230 A1 | 2/2012 | Devereux |
| 2012/0060184 A1 | 3/2012 | Nguyen et al. |
| 2012/0079525 A1 | 3/2012 | Ellis et al. |
| 2012/0164937 A1 | 6/2012 | Rao |
| 2012/0233644 A1 | 9/2012 | Rao |
| 2012/0240146 A1 | 9/2012 | Rao |
| 2012/0265613 A1 | 10/2012 | Ramer et al. |
| 2012/0278823 A1 | 11/2012 | Rogers et al. |
| 2012/0284324 A1 | 11/2012 | Jarville et al. |
| 2012/0297311 A1 | 11/2012 | Duggal |
| 2013/0096985 A1 | 4/2013 | Robinson et al. |
| 2013/0238445 A1 | 9/2013 | Rao |
| 2014/0038159 A1 | 2/2014 | Rao |
| 2014/0120868 A1 | 5/2014 | Rao |
| 2015/0381759 A1 | 12/2015 | Rao |
| 2018/0337973 A1 | 11/2018 | Rao |
| 2018/0375917 A1 | 12/2018 | Rao |

OTHER PUBLICATIONS

U.S. Appl. No. 13/7869,678, Apr. 8, 2016, Office Action.
U.S. Appl. No. 14/985,353, Apr. 1, 2016, Office Action.
U.S. Appl. No. 14/985,353, Aug. 19, 2016, Office Action.
U.S. Appl. No. 14/985,353, Nov. 16, 2016, Office Action.
WebdesignerDepot Staff (The Evolution of Cell Phone Design Between 1983-2009, May 2009).
U.S. Appl. No. 13/412,574, May 5, 2017, Notice of Allowance.
U.S. Appl. No. 13/869,678, May 18, 2017, Office Action.
U.S. Appl. No. 14/985,353, Apr. 14, 2017, Office Action.
U.S. Appl. No. 13/869,678, Oct. 5, 2017, Office Action.
U.S. Appl. No. 14/985,355, Jul. 12, 2017, Office Action.
U.S. Appl. No. 14/985,355, Dec. 28, 2017, Office Action.
U.S. Appl. No. 14/985,330, Nov. 17, 2017, Office Action.
U.S. Appl. No. 14/985,334, Nov. 17, 2017, Office Action.
U.S. Appl. No. 14/985,336, Dec. 13, 2017, Office Action.
U.S. Appl. No. 14/985,330, filed Dec. 30, 2015, Rao.
U.S. Appl. No. 14/985,334, filed Dec. 30, 2015, Rao.
U.S. Appl. No. 14/985,336, filed Dec. 30, 2015, Rao.
U.S. Appl. No. 14/985,340, filed Dec. 30, 2015, Rao.
U.S. Appl. No. 14/985,342, filed Dec. 30, 2015, Rao.
U.S. Appl. No. 14/985,351, filed Dec. 30, 2015, Rao.
U.S. Appl. No. 14/985,352, filed Dec. 30, 2015, Rao.
U.S. Appl. No. 14/985,353, filed Dec. 30, 2015, Rao.
U.S. Appl. No. 14/985,355, filed Dec. 30, 2015, Rao.
U.S. Appl. No. 10/985,702, Oct. 4, 2007, Office Action.
U.S. Appl. No. 10/985,702, Apr. 28, 2008, Office Action.
U.S. Appl. No. 10/985,702, Sep. 11, 2008, Office Action.
U.S. Appl. No. 10/985,702, Apr. 28, 2009, Office Action.
U.S. Appl. No. 10/985,702, Dec. 8, 2009, Office Action.
U.S. Appl. No. 10/985,702, Aug. 6, 2010, Office Action.
U.S. Appl. No. 11/010,985, Nov. 22, 2006, Office Action.
U.S. Appl. No. 11/010,985, May 18, 2007, Notice of Allowance.
U.S. Appl. No. 11/807,670, Dec. 22, 2009, Office Action.
U.S. Appl. No. 11/807,670, Sep. 7, 2010, Office Action.
U.S. Appl. No. 11/807,670, May 27, 2011, Office Action.
U.S. Appl. No. 11/807,670, Jan. 11, 2012, Office Action.
U.S. Appl. No. 11/807,670, May 17, 2012, Office Action.
U.S. Appl. No. 11/807,672, Jul. 9, 2009, Office Action.
U.S. Appl. No. 11/807,672, Jul. 29, 2010, Office Action.
U.S. Appl. No. 11/807,672, Apr. 27, 2011, Office Action.
U.S. Appl. No. 11/807,672, Mar. 20, 2012, Notice of Allowance.
U.S. Appl. No. 11/810,597, Jan. 28, 2010, Office Action.
U.S. Appl. No. 11/810,597, Oct. 13, 2010, Office Action.
U.S. Appl. No. 11/810,597, May 16, 2011, Office Action.
U.S. Appl. No. 11/810,597, Oct. 21, 2011, Office Action.
U.S. Appl. No. 11/810,597, Apr. 5, 2012, Office Action.
U.S. Appl. No. 11/810,597, Sep. 25, 2012, Office Action.
U.S. Appl. No. 11/821,771, Nov. 26, 2010, Office Action.
U.S. Appl. No. 11/821,771, Jun. 29, 2011, Office Action.
U.S. Appl. No. 11/821,771, Dec. 14, 2011, Notice of Allowance.
U.S. Appl. No. 11/823,006, Nov. 28, 2011, Office Action.
U.S. Appl. No. 11/823,006, Apr. 11, 2012, Office Action.
U.S. Appl. No. 11/823,006, Jun. 3, 2013, Office Action.
U.S. Appl. No. 11/823,006, Mar. 10, 2014, Office Action.
U.S. Appl. No. 11/881,195, Sep. 28, 2010, Office Action.
U.S. Appl. No. 11/881,195, Jun. 9, 2011, Office Action.
U.S. Appl. No. 11/881,195, May 21, 2012, Office Action.
U.S. Appl. No. 11/881,195, Oct. 18, 2012, Office Action.
U.S. Appl. No. 11/881,195, Jul. 18, 2013, Office Action.
U.S. Appl. No. 11/881,195, Dec. 11, 2013, Notice of Allowance.
U.S. Appl. No. 11/888,100, Aug. 4, 2010, Office Action.
U.S. Appl. No. 11/888,100, May 27, 2011, Office Action.
U.S. Appl. No. 11/888,100, Dec. 19, 2011, Notice of Allowance.
U.S. Appl. No. 11/891,193, Sep. 2, 2010, Office Action.
U.S. Appl. No. 11/891,193, May 16, 2011, Office Action.
U.S. Appl. No. 11/891,193, Jan. 27, 2012, Office Action.
U.S. Appl. No. 11/891,193, Apr. 13, 2012, Notice of Allowance.
U.S. Appl. No. 11/891,193, Jan. 4, 2013, Notice of Allowance.
U.S. Appl. No. 11/891,183, Oct. 5, 2010, Office Action.
U.S. Appl. No. 11/891,183, Mar. 15, 2011, Office Action.
U.S. Appl. No. 11/897,183, Dec. 16, 2011, Office Action.
U.S. Appl. No. 11/897,183, Jul. 2, 2012, Notice of Allowance.
U.S. Appl. No. 11/897,183, Oct. 16, 2012, Notice of Allowance.
U.S. Appl. No. 11/977,763, Aug. 4, 2010, Office Action.
U.S. Appl. No. 11/977,763, Apr. 4, 2011, Notice of Allowance.
U.S. Appl. No. 11/977,764, Sep. 2, 2010, Office Action.
U.S. Appl. No. 11/977,764, Feb. 22, 2011, Notice of Allowance.
U.S. Appl. No. 11/978,851, Feb. 24, 2011, Office Action.
U.S. Appl. No. 11/978,851, Nov. 2, 2011, Office Action.
U.S. Appl. No. 11/978,851, Jun. 18, 2012, Office Action.
U.S. Appl. No. 12/011,238, Jul. 8, 2010, Office Action.
U.S. Appl. No. 12/011,238, Feb. 9, 2011, Office Action.
U.S. Appl. No. 12/011,238, Sep. 14, 2011, Office Action.
U.S. Appl. No. 12/011,238, Aug. 14, 2012, Office Action.
U.S. Appl. No. 12/011,238, Feb. 27, 2013, Office Action.
U.S. Appl. No. 12/011,238, Sep. 19, 2013, Office Action.
U.S. Appl. No. 13/017,024, Nov. 21, 2012, Office Action.
U.S. Appl. No. 13/075,144, Aug. 25, 2011, Notice of Allowance.
U.S. Appl. No. 13/075,882, Mar. 25, 2013, Office Action.
U.S. Appl. No. 13/075,882, Oct. 8, 2013, Office Action.
U.S. Appl. No. 13/075,882, Oct. 17, 2014, Notice of Allowance.
U.S. Appl. No. 13/093,733, Sep. 14, 2011, Office Action.
U.S. Appl. No. 13/093,733, Jan. 26, 2012, Office Action.
U.S. Appl. No. 13/093,733, Mar. 19, 2012, Notice of Allowance.

(56) References Cited

OTHER PUBLICATIONS

U.S. Appl. No. 13/237,625, Oct. 15, 2012, Office Action.
U.S. Appl. No. 13/237,625, Nov. 30, 2012, Notice of Allowance.
U.S. Appl. No. 13/354,811, May 9, 2013, Notice of Allowance.
U.S. Appl. No. 13/397,136, Jun. 4, 2012, Office Action.
U.S. Appl. No. 13/397,136, Jan. 24, 2013, Notice of Allowance.
U.S. Appl. No. 13/402,880, Sep. 10, 2012, Office Action.
U.S. Appl. No. 13/402,880, Apr. 18, 2013, Office Action.
U.S. Appl. No. 13/402,880, Jun. 25, 2013, Notice of Allowance.
U.S. Appl. No. 13/412,574, Dec. 20, 2012, Office Action.
U.S. Appl. No. 13/412,574, Aug. 15, 2013, Office Action.
U.S. Appl. No. 13/412,574, Jan. 5, 2015, Office Action.
U.S. Appl. No. 13/412,574, Jul. 15, 2015, Office Action.
U.S. Appl. No. 13/473,603, Nov. 7, 2013, Office Action.
U.S. Appl. No. 13/473,606, May 30, 2014, Office Action.
U.S. Appl. No. 13/473,606, Aug. 21, 2014, Office Action.
U.S. Appl. No. 13/473,605, Oct. 11, 2012, Office Action.
U.S. Appl. No. 13/473,605, Jun. 25, 2013, Notice of Allowance.
U.S. Appl. No. 13/554,619, Mar. 12, 2013, Office Action.
U.S. Appl. No. 13/554,619, Jun. 13, 2013, Notice of Allowance.
U.S. Appl. No. 13/554,685, Dec. 29, 2014, Office Action.
U.S. Appl. No. 13/554,685, Feb. 26, 2015, Notice of Allowance.
U.S. Appl. No. 13/869,678, Oct. 20, 2015, Office Action.
U.S. Appl. No. 13/902,839, Oct. 30, 2013, Office Action.
U.S. Appl. No. 13/902,839, Feb. 4, 2014, Notice of Allowance.
U.S. Appl. No. 13/908,447, Jun. 24, 2015, Notice of Allowance.
U.S. Appl. No. 14/047,015, Nov. 30, 2015, Office Action.
U.S. Appl. No. 14/059,878, May 20, 2015, Notice of Allowance.
U.S. Appl. No. 14/059,878, Jun. 24, 2015, Notice of Allowance.
U.S. Appl. No. 14/147,600, Apr. 21, 2015, Office Action.
U.S. Appl. No. 14/147,600, Nov. 4, 2015, Notice of Allowance.
Internal Revenue Service, Department of the Treasury, 1040 Instruction, 2004, entire document.
U.S. Appl. No. 13/412,574, Dec. 12, 2016, Office Action.
U.S. Appl. No. 14/985,355, Feb. 7, 2017, Office Action.
Fritzsche, David J., Building Tutorials Using Wine, 2005, Developments in Business Simulations and Experiential Learning, vol. 32 (Year: 2005).
U.S. Appl. No. 14/985,336, Jul. 26, 2018, Office Action.
U.S. Appl. No. 09/806,544, titled: "Conversational browser and conversational systems," filed Jul. 2, 2001.
U.S. Appl. No. 61/471,991, titled "Tangible Anchoring System for Broadcast/Webcast Studios," filed Apr. 5, 2011.
U.S. Appl. No. 13/869,678, Apr. 5, 2018, Office Action.
U.S. Appl. No. 14/985,355, Jun. 20, 2018, Office Action.
U.S. Appl. No. 14/985,330, Apr. 5, 2018, Office Action.
U.S. Appl. No. 14/985,334, May 3, 2018, Office Action.
U.S. Appl. No. 14/985,351, Apr. 16, 2018, Office Action.
U.S. Appl. No. 14/985,352, Jun. 28, 2018, Office Action.
U.S. Appl. No. 14/985,355, Nov. 16, 2018, Office Action.
U.S. Appl. No. 14/985,351, Nov. 29, 2018, Office Action.
U.S. Appl. No. 16/051,295, Oct. 4, 2018, Office Action.
U.S. Appl. No. 16/051,306, Oct. 4, 2018, Office Action.
U.S. Appl. No. 14/985,336, Jan. 11, 2019, Office Action.
U.S. Appl. No. 14/985,352, Feb. 25, 2019, Office Action.
U.S. Appl. No. 14/985,352, Jun. 19, 2019, Office Action.
U.S. Appl. No. 16/051,295, Feb. 21, 2019, Office Action.
U.S. Appl. No. 16/051,295, May 30, 2019, Office Action.
U.S. Appl. No. 16/051,306, Feb. 21, 2019, Office Action.
U.S. Appl. No. 14/985,336, Aug. 7, 2019, Office Action.
U.S. Appl. No. 14/985,352, Sep. 18, 2019, Office Action.
U.S. Appl. No. 15/051,306, Sep. 18, 2019, Office Action.
U.S. Appl. No. 14/985,340, Oct. 4, 2019, Office Action.
U.S. Appl. No. 14/455,555, Oct. 30, 2019, Office Action.
U.S. Appl. No. 14/985,342, Oct. 31, 2019, Office Action.
Office Action, U.S. Appl. No. 16/051,295, dated Nov. 6, 2019.
Office Action, U.S. Appl. No. 16/051,306, dated Dec. 11, 2019.
Notice of Allowance, U.S. Appl. No. 16/051,295, dated Feb. 20, 2020.
Notice of Allowance, U.S. Appl. No. 16/051,306, dated Feb. 19, 2020.
Notice of Allowance, U.S. Appl. No. 16/051,306, dated Mar. 17, 2020.

\* cited by examiner

MEDIA MANAGEMENT SYSTEM SUPPORTING A PLURALITY OF MOBILE DEVICES

CROSS REFERENCES TO RELATED APPLICATIONS

This application is a continuation of U.S. application Ser. No. 14/848,134, filed Sep. 8, 2015, which is a continuation of U.S. application Ser. No. 13/908,447, filed Jun. 3, 2013, now issued as U.S. Pat. No. 9,158,437, which is a continuation of U.S. application Ser. No. 13/354,811, filed Jan. 20, 2012, now issued as U.S. Pat. No. 8,478,250, which is a continuation-in-part of U.S. application Ser. No. 11/888,100, filed Jul. 30, 2007, now issued as U.S. Pat. No. 8,131,270, which claims the benefit of and priority to U.S. Provisional Application No. 60/860,700, filed Nov. 22, 2006. Each of the aforementioned applications and patents are hereby incorporated by reference herein in their entirety.

This patent application makes reference to U.S. patent application Ser. No. 11/977,764 entitled "MEDIA DISTRIBUTION SERVER THAT PRESENTS INTERACTIVE MEDIA TO A MOBILE DEVICE," filed on Oct. 25, 2007. The complete subject matter of the above-referenced United States patent application is hereby incorporated herein by reference, in its entirety.

BACKGROUND

1. Technical Field

The present invention relates generally to management of media; and, more particularly, to management of interactive media that is distributed to mobile devices.

2. Related Art

Cell (mobile) phones are widely used as mobile devices to communicate anywhere in the world. Some of them are very simple devices capable of voice communication alone. Many other today's mobile devices are used for multiple purposes, other than voice communication, in any convenient location. They keep record of appointments and schedules, store addresses, present calendars, surf Internet, play games among many other purposes. They are capable of playing music and other audio clips, and also play video clips and movies. They can be networked with external devices such as other mobile phones, laptops and personal computers and modems via infrared, Bluetooth and wifi interfaces. This enormously increases their functionality when compared to just few years ago.

Very few mobile devices are capable of displaying interactive media. Very few servers are equipped with the technologies and tools needed to distribute interactive media and adequately support user interactions—they are more likely to just support download by user of streaming content, such as a video from YouTube or a song from iTunes server. Users are therefore forced to passively watch video clips delivered from YouTube service or passively listen to songs downloaded from servers such as iTunes servers and others of that kind.

Today's mobile devices have extensive processing ability and capable accomplishing many tasks that were usually meant for personal computer alone. However, battery life is always a concern, with batteries needing to be charged every couple of days. Some modern mobile devices have wide screens with alpha numeric keyboards and many soft (programmable) keys. These devices are programmable and have ability to download programs such as XML (eXtensible Markup Language) files and run them on mobile devices. These programs accomplish many tasks such as managing daily tasks, assisting marketing, keeping data and files stored, managing databases etc. However, today the range of these programs are very limited and they accomplish far less tasks than there is demand among people.

The iTunes service from Apple Corp. provides a server based music distribution service. However, it does not distribute interactive media, or other content created by/for enterprises, content providers, etc. The YouTube service provided by Google Inc. makes it possible for users t upload videos taped by them, and other users to download it or view it on the web. However, it does not provide interactive media, and it does not provide surveys based on interactive media, and in addition, it does not provide means to manage interactive media.

Microsoft Content Management Server facilitates storing and distributing content, but it does not seem to support management of interactive media, the management of the distribution of interactive media, gathering user responses for those interactive media, sending the user responses to content and service providers, providing report generation facilities for user responses collected, etc.

Thus there is a need in the market for a management server for managing interactive media, the distribution of interactive media. There is a need for a management server one that not only supports distributing interactive media by one or more servers, but also facilitates gathering user responses for those interactive media, sending the user responses to content and service providers, providing report generation facilities for user responses collected, etc. There is need for a management server for interactive media that helps manage the life-cycle of interactive media, and subscription to services that provide interactive media, and billing associated with distributing interactive media—all the features provided by the present invention.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
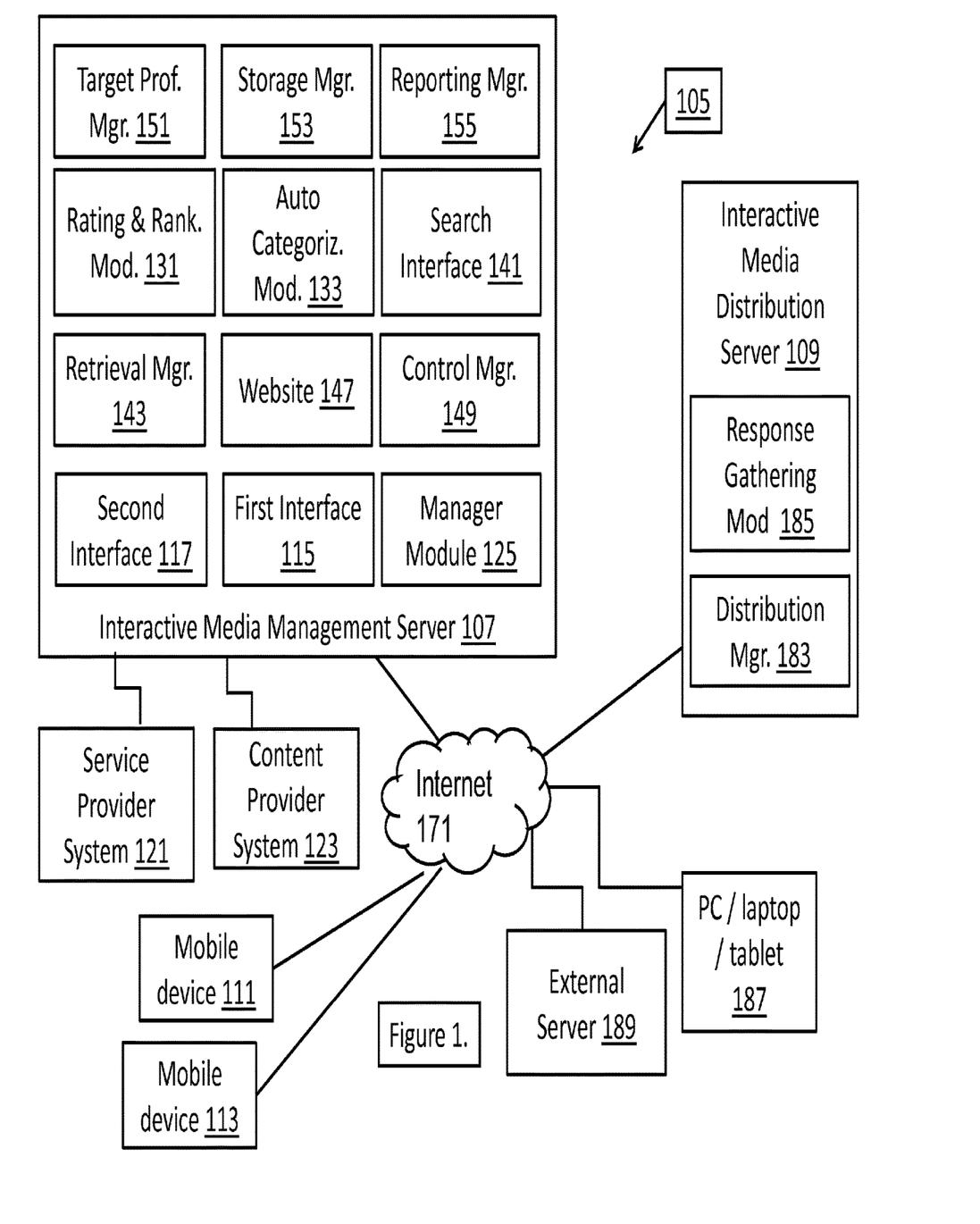
FIG. 1 is a schematic block diagram illustrating an interactive media management server that not only supports distribution of interactive media by one or more servers, but also facilitates gathering user responses for those interactive media, sending the user responses to content and service providers, providing report generation facilities for user responses collected, etc.

FIG. 1 is a schematic block diagram illustrating an interactive media management server 107 that not only supports distribution of interactive media by one or more servers, but also facilitates gathering user responses for those interactive media, sending the user responses to content and service providers, providing report generation facilities for user responses collected, etc. The interactive media management server 107 for interactive media that helps manage the life-cycle of interactive media, and subscription to services that provide interactive media, and billing associated with distributing interactive media The interactive media management server 107 comprises a first interface 115 to an interactive media distribution server 109 communicatively coupled to a plurality of mobile devices 111, 113, and a second interface 117 to a service provider system 121 or a content provider system 123. It comprises a manager module 125 for managing creation, distribution and tracking of a plurality of interactive media. The manager module 125, via the second interface 117, manages the delivery of the plurality of interactive media from the service provider system 121 or the content provider system 123, and the communication of user responses to the plurality of interactive media to the corresponding service provider system 121 or content provider system 123.

The manager module 125 selectively facilitates storage, status change to active or inactive, updates, removal, replacement, ranking, rating, comments, feedback and tracking of usage for each of the plurality of interactive media via the first interface 115. It also manages the distribution of interactive media and the life-cycle of the interactive media. A rating and ranking module 131 in the interactive media management server 107 is configured at least to generate ratings and rankings for the plurality of interactive media based at least on the user inputs, and an automatic categorization module 133 categorizes interactive media as it is received from the service provider system 121, content provider system 123 or from one or more of the plurality of mobile devices 111, 113 communicatively coupled to the interactive media distribution server 109.

The interactive media management server 107 also comprises a search interface 141 that is used for retrieval of at least one of the plurality of interactive media and a retrieval manager 143 that coordinates providing a sample portion of at least one of the plurality of interactive media before selectively providing the entire version of the at least one of the plurality of interactive media, as necessary.

The manager module 125 manages the delivery of samples of, or references to, the plurality of interactive media, to the plurality of mobile devices 111, 113 based at least on recent retrievals by users of the plurality of mobile devices 111, 113. The manager module 125 automatically generates a report, and presents it to one or more recipients as required, wherein the report comprises recent user inputs received from users of the plurality of mobile devices 111, 113. Recent user inputs received are those received during a period of a day, a week, a month or a set duration specified.

The manager module 125 identifies an appropriate advertisement for each of the plurality of mobile devices 111, 113 based at least on previous advertisements presented and previous retrievals of interactive media from the corresponding one of the plurality of mobile devices 111, 113.

The interactive media management server 107 regularly communicates retrieval and user input data to the service provider system 121 or content provider system 123, wherein such communication is in live mode if necessary and in batched mode by default.

The interactive media management server 107 also comprises a website 147 for creation of interactive media by a plurality of interactive media providers, a control manager 149, a target profile manager 151, a storage manager 153 and a reporting manager 155. The website 147 also provides a report generation facility for retrieval of user inputs provided by users to specific ones of the plurality of interactive media in an XML format, CSV format, PDF format, HTML or text format.

The control manager 149 assigns and manages a start date and an end date to each of the plurality of interactive media, as necessary. The target profile manager 151 determines a target user profile for at least one of the plurality of interactive media and facilitates distribution of the at least one of the plurality of interactive media based on the target user profile. The storage manager 153 creates, in an automated fashion, a database and associated tables for collecting responses to individual interactive media, as necessary. It also provides references to uploaded audio, photo and video data provided by users as part of their user inputs to specific ones of the plurality of interactive media, wherein such references are used for communicating collected responses to individual interactive media to external servers. The reporting manager 155 presents or forwards, in an automated fashion, a report created daily, weekly, and monthly, comprising usage, ranking, rating, comments, feedback and other related information, for each of the plurality of interactive media.

In one embodiment, the interactive media management server 107 also comprises a sample generator module that generates a sample version of one of the plurality of interactive media. In general, a sample is a subset of a complete original version of the interactive media. For example, a sample of an interactive movie/video that is 1 hour long can be an interactive trailer that is 2 minutes long. In addition, the manager module 125, by default, facilitates the delivery of the sample version of the one of the plurality of interactive media. It also, when requested, provides the original version of the one of the plurality of interactive media. In a related embodiment, the interactive media management server 107 has a media distribution server 109 that is integrated into the interactive media management server 107, and the interactive media management server 107 is also capable of distributing the plurality of interactive media to the plurality of mobile devices 111, 113 and receives user inputs from the plurality of mobile devices 111, 113 and processes them.

In a different embodiment, the interactive media management server 107 also comprises a edge caching interface 161 that makes it possible to configure an external edge caching cache 163 for subsets of components of each of the plurality of interactive media based on their usage and a locale associated with each of the plurality of mobile devices 111, 113. The edge caching interface 161 selectively makes a copy of a specific interactive media at a preset interval and communicates this copy to the external edge caching cache 163 that is located in a close geographical proximity to a significant number of the plurality of mobile devices 111, 113.

In one embodiment, the interactive media management server 107 also comprises the interactive media distribution server 109, and provides all the features of the interactive media distribution server 109. Thus is combines management of interactive media with distribution of interactive media and collecting user responses for the interactive media (and management of such user responses).

Figure 2:
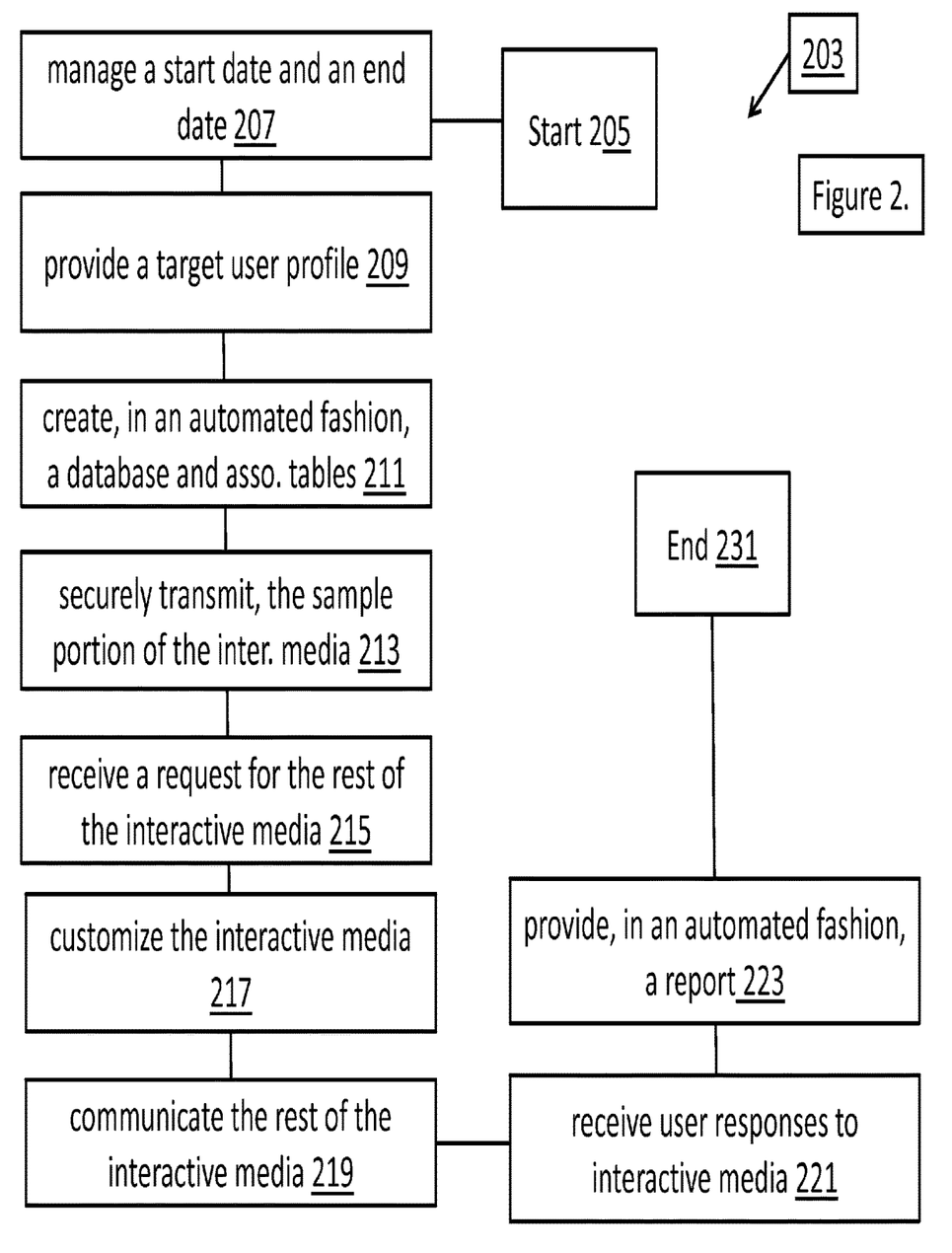
FIG. 2 is a flow chart that describes an exemplary operation of an interactive media management server, as it manages the acquisition, generation and collecting of interactive media, the distribution of interactive media, managing the life-cycle of interactive media, etc.

FIG. 2 is a flow chart that describes an exemplary operation of an interactive media management server 107, as it manages the acquisition, generation and collecting of interactive media, the distribution of interactive media, the life-cycle of interactive media, etc. At a start block 205, the operation starts when the interactive media management server 107 receives an interactive media from a content provider system or a service provider system. It optionally arranges, by using a configuring module, the received interactive media into an initial sample portion and a rest of the interactive media portion. It assigns it a status of "active" by default, although other life-cycle status such as "inactive", "deleted", "suspended", etc. may be assigned as necessary.

The interactive media management server 107, at a next block 207, manages a start date and an end date for each of a plurality of interactive media that requires such settings. Then, at a next block 209, it provides a target user profile for each of a plurality of interactive media. Such target user profile may be submitted along with an associated interactive media by an advertisement company that provides ads, a content provider providing content, a service provider offering an interactive media as part of a service delivery, etc.

In one embodiment, while managing newly received interactive media, at a next block 211, the interactive media management server 107 creates, in an automated fashion, a database (if necessary) and associated tables (as needed) for collecting responses to each of a plurality of interactive media, as necessary. For example, it might create one new table for each new interactive media received. Or it might use the same table for responses received for all interactive media that originate from one source, such as a specific content provider, or a specific company.

At a next block 213, the an interactive media management server 107 securely transmits, employing a transmitting module, the sample portion of the interactive media initially to the electronic device such as a mobile device 111, tablet, or a PC/laptop. Then, at a next block 215, it receives a request for the rest of the interactive media from the electronic device subsequently. Then, at a next block 217, it customizes the rest of the interactive media based at least on the locale associated with the electronic device. At a next block 219, it also communicates the rest of the interactive media to the electronic device. In one embodiment, customizing is also based on an interest shown by a user of the electronic device in various categories of interactive media or based on the participation of the user in one or more social networks.

Then, at a next block 221, the interactive media management server 107 receives user responses to interactive media reviewed by/used by users (from mobile devices, tablets, PCs/laptops, etc.). It also provides references to uploaded audio, photo and video data provided by users as part of their user inputs to specific ones of the plurality of interactive media, wherein such references are used for communication of collected responses to individual ones of the plurality of interactive media to external servers (such as a content provider system or service provider system, etc.).

Then, at a next block 223, the interactive media management server 107 provides, in an automated fashion, a report created daily, weekly, and monthly, to one or more registered recipients. Alternatively, registered users can create such reports using the website associated. Such reports typically comprise usage, ranking, rating and other related information, for each of the plurality of interactive media (that the user is interested in). In addition, customized reports are supported for each service provider/content provider/company/client who may have subscribed to a reporting service.

Finally, at an end block 231, it terminates processing of the operation.

In one embodiment, the interactive media management server 107 supports verifying, from subscription records, whether the user has a subscription to a service that provides access to a requested one of a plurality of interactive media, in the block 213. It provides the requested one of the plurality of interactive media after verifying that the user has an active subscription to access the requested one of the plurality of interactive media.

In one embodiment, in the block 221, the interactive media management server 107 receives, from the user, in response to the interactive media, a user input wherein the user input comprises at least one or more photos, one or more recorded audio, or one or more video clips. It then makes the received one or more photos, one or more recorded audio, or one or more video clips available for review and processing by at least one authorized manager via a website page associated with the interactive media management server 107. It also provides access selectively to the at least one or more photos, one or more recorded audio, or one or more video clips from an external server for processing and storage. Thus, portions of user responses can be selectively retrieved and stored in external storages, and included in reports generated and shared with service providers, content providers, creators and owners of interactive media, etc.

Figure 3:
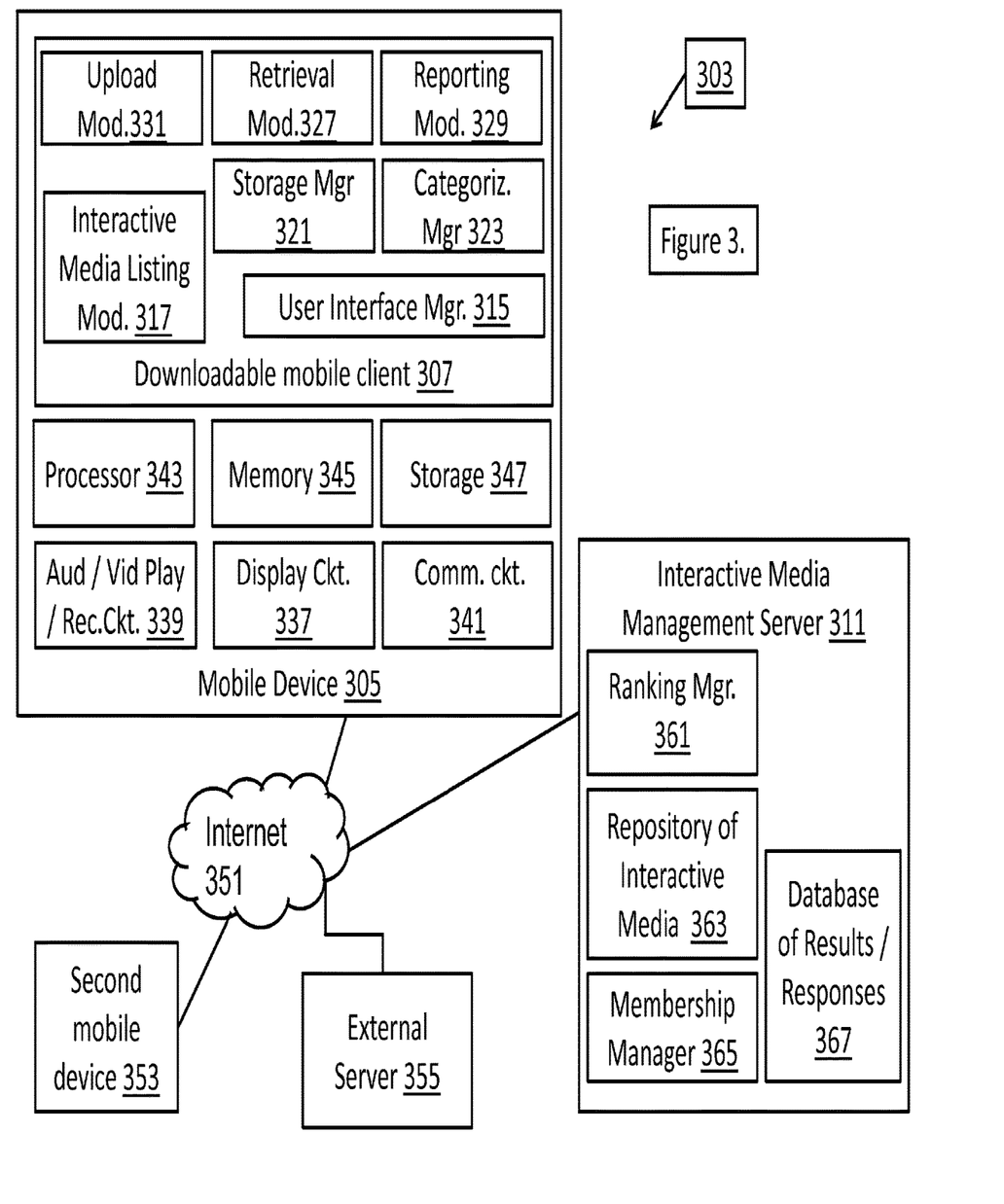
FIG. 3 is a perspective block diagram of a mobile device that comprises a mobile client that is capable of displaying, and letting a user interact with, an interactive media.

FIG. 3 is a perspective block diagram of a mobile device 305 that comprises a mobile client 307 that is capable of displaying, and letting a user interact with, an interactive media. The mobile client 307 in the mobile device 305 interacts with the interactive media management server 311 and presents interactive media under the management of the interactive media management server 311. The mobile client 307 comprises a user interface manager 315 that is configured to receive user inputs provided by a user as the mobile client 307 displays an interactive media, wherein the user inputs is subsequently associated with the interactive media currently being displayed. It also comprises an interactive media listing module 317 that also displays ratings and rankings to aid selection of the interactive media.

The mobile device 305 comprises a display circuitry 337, an audio/video playback & recording circuitry 339, a processor 343, a memory 345, a storage 347, at least one wireless communication means 341, etc. in addition to the mobile client 307.

The mobile client 307 also comprises a storage manager 321 capable of receiving, storing and playing the interactive media as it is received, and a categorization module 323 that identifies a category for the interactive media and a category of the user inputs provided by a user. It also comprises a retrieval module 327 that retrieves the interactive media and also comprises a search interface for the searching and the retrieval of the interactive media, and a reporting module 329 that communicates to the interactive media management server the user inputs provided by the user along with an identified category of the user inputs and metadata associated with the user inputs.

The mobile client 307 receives and selectively displays a sample portion of at least one of the plurality of interactive media, and, if requested by the user, subsequently retrieves the rest of the at least one of the plurality of interactive media. The user inputs provided by a user after reviewing a typical interactive media (customized optionally to a user by a server 311) comprises user selections from drop-down lists provided, radio button selections, recorded audio provided by user employing a microphone available in the mobile device, a photo taken by the user using a camera available in the mobile device, a video clip taken by the user, and optional text data inputs provided by the user in response to text input solicitations.

The mobile client 307 also comprises an upload module 331 that uploads the recorded audio, a photo, and a video clip taken by the user to the interactive media management server 311. The upload module 331 retrieves references to such uploaded data. The mobile client 307 incorporates the references to uploaded data into a response message that also comprises user selections for drop-down lists, text inputs, user selections to the radio button selections. The mobile client 307 sends the response packet to the interactive media management server 311 for processing.

The terms "circuit" and "circuitry" as used herein may refer to an independent circuit or to a portion of a multi-functional circuit that performs multiple underlying functions. For example, depending on the embodiment, processing circuitry may be implemented as a single chip processor or as a plurality of processing chips. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method comprising:
receiving, from a client device associated with a user, a request for an initial portion of an electronic survey;
based on geographic location information received from the client device, determining a geographic locale and a local language for the client device;
providing, to the client device, the initial portion of the electronic survey for a first graphical presentation within a graphical user interface for the client device, the initial portion of the electronic survey comprising an initial survey question in the local language and selectable options corresponding to an initial set of survey responses in the local language to the initial survey question;
receiving, from the client device, a request for an additional portion of the electronic survey;
based in part on the geographic locale for the client device, creating, by at least one processor, a customized remaining portion of the electronic survey for a second graphical presentation within the graphical user interface for the client device by selecting a subsequent survey question in the local language customized for the geographic locale and selectable options corresponding to a subsequent set of survey responses in the local language to the subsequent survey question; and
providing, to the client device, the customized remaining portion of the electronic survey for the second graphical presentation within the graphical user interface for the client device.

2. The method of claim 1, wherein receiving the request for the additional portion of the electronic survey is in response to the client device sending a survey response to the initial survey question in the local language from the initial set of survey responses in the local language.

3. The method of claim 1, further comprising:
identifying an additional survey question customized for the geographic locale; and
creating the customized remaining portion of the electronic survey by selecting the additional survey question customized for the geographic locale within the customized remaining portion.

4. The method of claim 3, further comprising receiving, from the client device, survey responses in the local language to the subsequent survey question customized for the geographic locale and the additional survey question customized for the geographic locale.

5. The method of claim 4, further comprising generating a customized report for the geographic locale.

6. The method of claim 5, wherein the customized report for the geographic locale comprises the survey responses to the subsequent survey question customized for the geographic locale and the addition survey question customized for the geographic locale.

7. The method of claim 1, further comprising:

receiving, from the client device, an indication of interest by the user in the initial portion of the electronic survey; and creating the customized remaining portion of the electronic survey for the second graphical presentation within the graphical user interface for the client device based in part on the indication of interest by the user in the initial portion of the electronic survey.

8. The method of claim 1, wherein:

the initial survey question in the local language comprises an invitation to the user to participate in the electronic survey; and the request for the additional portion of the electronic survey comprises a survey response from the initial set of survey responses in the local language comprising an acceptance of the invitation.

9. The method of claim 1, further comprising receiving a target geographic locale for the electronic survey.

10. The method of claim 9, further comprising identifying the user by matching the target geographic locale with geographic profile information within a user profile of the user.

11. A system, comprising:

at least one processor; and at least one non-transitory computer readable storage medium storing instructions thereon that, when executed by the at least one processor, cause the system to:

receive, from a client device associated with a user, a request for an initial portion of an electronic survey;

based on geographic location information received from the client device, determine a geographic locale and a local language for the client device;

provide, to the client device, the initial portion of the electronic survey for a first graphical presentation within a graphical user interface for the client device, the initial portion of the electronic survey comprising an initial survey question in the local language and selectable options corresponding to an initial set of survey responses in the local language to the initial survey question;

receive, from the client device, a request for an additional portion of the electronic survey;

based in part on the geographic locale for the client device, create a customized remaining portion of the electronic survey for a second graphical presentation within the graphical user interface for the client device by selecting a subsequent survey question in the local language customized for the geographic locale and selectable options corresponding to a subsequent set of survey responses in the local language to the subsequent survey question; and provide, to the client device, the customized remaining portion of the electronic survey for the second graphical presentation within the graphical user interface for the client device.

12. The system of claim 11, further comprising instructions that, when executed by the at least one processor, cause the system to:

receive, from the client device, a survey response from the subsequent set of survey responses in the local language to the subsequent survey question within the customized remaining portion of the electronic survey; and associate the survey response with the geographic locale for the client device.

13. The system of claim 12, further comprising instructions that, when executed by the at least one processor, cause the system to:

identify a plurality of geographic locales corresponding to a plurality of client devices, wherein each client device of the plurality of client devices provides to the system particular geographic location information; and administer electronic surveys in a plurality of local languages to a plurality of additional users via the plurality of client devices based in part on the geographic locales corresponding to each client device of the plurality of client devices.

14. The system of claim 13, further comprising instructions that, when executed by the at least one processor, cause the system to associate survey responses from each client device of the plurality of client devices with a corresponding geographic locale for each client device.

15. The system of claim 14, further comprising instructions that, when executed by the at least one processor, cause the system to generate a response report comprising the survey response from the client device and the survey responses from each of the plurality of client devices organized by geographic locations.

16. The system of claim 14, further comprising instructions that, when executed by the at least one processor, cause the system to generate a response report for a defined geographic region, wherein the response report for the geographic region comprises survey responses associated with geographic locales located within the geographic region.

17. A non-transitory computer readable storage media storing instructions thereon that, when executed by a processor, cause a computer system to:

receive, from a client device associated with a user, a request for an initial portion of an electronic survey;

based on geographic location information received from the client device, determine a geographic locale and a local language for the client device;

provide, to the client device, the initial portion of the electronic survey for a first graphical presentation within a graphical user interface for the client device, the initial portion of the electronic survey comprising an initial survey question in the local language and selectable options corresponding to an initial set of survey responses in the local language to the initial survey question;

receive, from the client device, a request for an additional portion of the electronic survey;

based in part on the geographic locale for the client device, create a customized remaining portion of the electronic survey for a second graphical presentation within the graphical user interface for the client device by selecting a subsequent survey question in the local language customized for the geographic locale and selectable options corresponding to a subsequent set of survey responses in the local language to the subsequent survey question; and provide, to the client device, the customized remaining portion of the electronic survey for the second graphical presentation within the graphical user interface for the client device.

18. The non-transitory computer readable storage media of claim 17, further comprising instructions that, when executed by the processor, cause the computer system to:

receive, from the client device, an initial survey response from the initial set of survey responses in the local language to the initial survey question in the local language and a subsequent response from the subsequent set of survey responses in the local language to the subsequent survey question in the local language; and associate the initial survey response and the subsequent survey response with the geographic locale for the client device.

19. The non-transitory computer readable storage media of claim 18, further comprising instructions that, when executed by the processor, cause the computer system to create a customized response report comprising the initial survey response and the subsequent survey response associated with the geographic locale.

20. The non-transitory computer readable storage media of claim 19, further comprising instructions that, when executed by the processor, cause the computer system to provide the customized response report to a service provider that subscribed to receive response reports associated with the geographic locale.

* * * * *